UNITED STATES PATENT OFFICE.

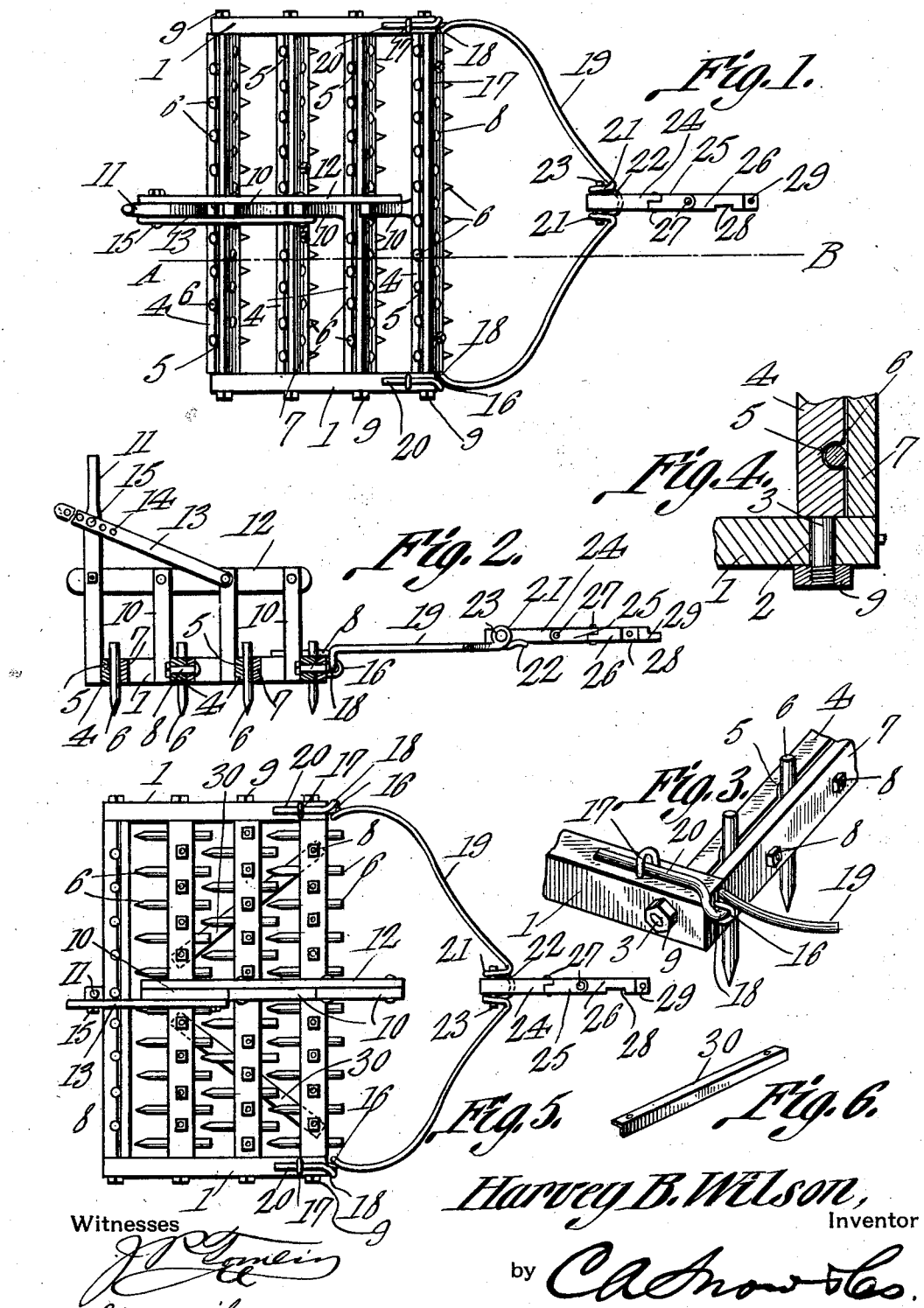

HARVEY B. WILSON, OF DEWITT, ILLINOIS.

HARROW ATTACHMENT FOR PLOWS.

1,019,210.   Specification of Letters Patent.   Patented Mar. 5, 1912.

Application filed November 8, 1911. Serial No. 659,261.

*To all whom it may concern:*

Be it known that I, HARVEY B. WILSON, a citizen of the United States, residing at Dewitt, in the county of Dewitt and State of Illinois, have invented a new and useful Harrow Attachment for Plows, of which the following is a specification.

This invention relates to harrows for use in connection with plows of different types, one of the objects of the invention being to provide a harrow which can be quickly converted into a scraper, said harrow including tooth carrying bars mounted for rotation and which carry means for engaging scraping blades while the teeth are supported out of operative position.

A further object is to provide improved means for connecting the harrow to a plow, said means being such as to cause the harrow to lift off of the ground when the plow is raised although permitting a certain amount of limited up and down movement of the harrow relative to the plow while the plow is in engagement with the soil.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings, the preferred form of the invention has been shown.

In said drawings:—Figure 1 is a plan view of the harrow. Fig. 2 is a section on line A—B Fig. 1. Fig. 3 is an enlarged perspective view of one corner portion of the harrow and showing one of the connections between the draft yoke and the harrow frame. Fig. 4 is an enlarged horizontal section through one end portion of one of the tooth carrying elements and a portion of the side of the harrow frame. Fig. 5 is a plan view of the harrow with scraping blades applied thereto. Fig. 6 is a perspective view of one of the scraping blades.

Referring to the figures by characters of reference 1 designates the side strips of the harrow, each strip having transversely extending openings 2 therein adapted to receive trunnions 3 extending from the ends of bars 4. These bars extend transversely of the harrow and each bar is provided, in one face, with notches or recesses 5 adapted to receive portions of the harrow teeth 6. The said teeth are held within the notches or recesses by means of holding plates 7 which extend throughout the length of the bars 4 and are fastened thereto by bolts 8 or the like. The free ends of the trunnions 3 are preferably screw threaded so as to be engaged by nuts 9 adapted to hold the side strips 1 in proper relation to the bars 4.

Centrally disposed arms 10 are fixedly connected to and extend upwardly from the bars 4 and the arm of the rearmost bar is elongated so as to form a lever 11. The various arms are connected by means of a strip 12 pivotally attached thereto and which is parallel to the plane occupied by the axes of the bars 4. A brace 13 is preferably pivotally connected to one of the bars 4 and is adjustably connected to the lever 11, there being a series of openings 14 in said brace and any one of which is adapted to receive a holding pin 15 engaging the lever 11. Thus it will be seen that, by detaching pin 15 from lever 11, all of the bars 4 can be simultaneously rotated so as to bring the teeth 6 to any desired angle relative to the surface thereunder. After the teeth have thus been adjusted, bar 13 can be resecured to lever 11 and the parts will thus be locked against relative movement.

Connecting loops 16 extend forwardly from the side strips 1 and guide loops 17 extend upwardly from said side strips adjacent their front ends. Each of the connecting loops 16 is pivotally engaged by an eye 18 formed at one end of a draft yoke 19 arranged in front of the tooth carrying bars. Fingers 20 extend rearwardly from the eyes 18 and through the guide loops 17. The middle portion 19 is bent, as shown in Figs. 1 and 2, to form spaced eyes 21 and a forwardly extending supporting lip 22. The eyes 21 receive the ends of a pivot bolt 23 extending through the rear section 24 of the draw bar. This section 24 laps and is adjustable angularly relative to the middle section 25 of the draw bar which, in turn, laps and is angularly adjustable relative to the front section 26 of the bar. The plane of adjustment of section 25 relative to section 24 is at right angles to the plane of adjustment of the section 26 relative to the section 25. Any suitable means may be provided for holding the sections of the draw bar against relative movement after they have been adjusted to predetermined angles and the connecting bolts 27 which extend through the lapping portions of the sections can be tightened in any suitable manner so as to securely clamp said lapping portions together.

The front section 26 of the draw bar has a notch or recess 28 in one side and another recess 29 in its front end. When the harrow is used in connection with some types of plows, such, for example, as a shovel plow, the standard of the plow is bolted or otherwise secured in the recess 28 whereas, with other types of plows, the recess 29 receives the portion of the plow structure to which the draw bar is connected.

In using the harrow thus far described, the draw bar is first attached to the plow structure after which the sections of the draw bar are adjusted relative to each other so as to bring the harrow into proper position relative to the plow. When the plow is lifted out of engagement with the soil, the harrow will tend to swing downwardly about the eyes 18 as pivots but this downward movement will be limited by loops 17 coming into contact with the fingers 20. Furthermore the downward movement of the harrow and its yoke 19 will be limited by the tongue 22 bearing upwardly against the rear section 24 of the draw bar. Thus it will be seen that when the plow is lifted out of the soil, the harrow will also be raised. When, however, the plow is brought into engagement with the soil, the teeth 6 of the harrow will engage the soil and pulverize it. Furthermore the harrow will be free to swing upwardly about the bolt 23 as a pivot and independently of the plow so as to pass over obstructions in the path thereof. As heretofore stated the angle of the teeth relative to the surface thereunder can be changed at will by shifting lever 11.

Should it be desired to use the structure as a scraper, the lever 11 is disconnected from the strip 12 and also from the brace 13 whereupon the three front bars 4 and their arms 10 will be free to swing so as to bring the teeth 6 into position between the side strips 1. Scraping blades 30 are then arranged upon the lower faces of the tooth carrying elements so as to converge rearwardly, certain of the bolts 8 being utilized for fastening these blades in position. As shown in Fig. 6, each blade is preferably L-shaped in cross section. When the blades are in position, the rear tooth carrying element is free to be used in connection therewith and can be adjusted by means of the lever 11.

What is claimed is:—

1. A harrow including side strips, tooth carrying members supported therebetween, a draw bar, a connection between the draw bar and side strips, means upon said connection and coöperating with the bar for limiting the swinging movement of the connection in one direction relative to the bar, and coöperating means upon said connection and the side strips for limiting the movement of said strips relative to the connection.

2. A harrow including side strips, soil engaging devices supported therebetween, a draw bar, a yoke pivotally connected thereto, means upon the yoke and coöperating with the bar for limiting the swinging movement of the yoke in one direction, a pivotal connection between ends of the yoke and the front ends of the side strips, and means upon the yoke and side strips for limiting the swinging movement of the said strips relative to the yoke.

3. A harrow including side strips, soil engaging elements interposed therebetween, a sectional draw bar, each section being adjustable angularly relative to the next adjoining sections, means for holding the sections against relative movement, a yoke pivotally connected to one of the sections, means upon the yoke and coöperating with said section for limiting the swinging movement of the yoke in one direction relative to the section, and connections between the ends of the yoke and the side strips.

4. A harrow including side strips, soil engaging elements interposed therebetween, a sectional draw bar, each section being adjustable angularly relative to the next adjoining sections, means for holding the sections against relative movement, a yoke pivotally connected to one of the sections, means upon the yoke and coöperating with said section for limiting the swinging movement of the yoke in one direction relative to the section, pivotal connections between the ends of the yoke and the side strips, guide loops upstanding from the side strips, and means extending from the yoke and through said loops and coöperating with the loops for limiting the movement of the side strips relative to the yoke.

5. The combination with a harrow, of a draw bar, a connection between the draw bar and the harrow, means upon said connection and coöperating with the bar for limiting the swinging movement of the connection in one direction relative to the bar, and coöperating means upon said connection and the harrow for limiting the movement of said harrow relative to the connection.

In testimony that I claim the foregoing as my own, I have hereto affixed my signature in the presence of two witnesses.

HARVEY B. WILSON.

Witnesses:
 CHAS. F. KEMP,
 MAE TRACY.

Copies of this patent may be obtained for five cents each, by addressing the "Commissioner of Patents, Washington, D. C."